United States Patent [19]
Trotter et al.

[11] Patent Number: 5,776,573
[45] Date of Patent: Jul. 7, 1998

[54] COMPACT DISC REVITALIZER FORMULATIONS AND REVITALIZER

[75] Inventors: J. Morgan Trotter, Dallas; Galen W. Hartman, Kemp, both of Tex.

[73] Assignee: CD Magic, Inc., Dallas, Tex.

Related U.S. Application Data

[60] Provisional application No. 60/015,769, Apr. 16, 1996.

[21] Appl. No.: 839,856
[22] Filed: Apr. 16, 1997
[51] Int. Cl.$^6$ ............................................. B39B 3/02
[52] U.S. Cl. .................. 428/64; 430/270.11; 428/412; 428/429; 528/196
[58] Field of Search ............................ 428/64, 412, 429; 528/196; 430/270.11

[56] References Cited

U.S. PATENT DOCUMENTS 5,633,106  5/1997  Aihara et al. .......................... 430/21

*Primary Examiner*—Terressa Mosley
*Attorney, Agent, or Firm*—Jeffrey T. Hubbard; W. Thomas Timmons; Timmons & Kelly

[57] ABSTRACT

A composition for use in refinishing optical discs comprises a mixture of volatile organic solvents having solubility parameters within a defined range, a chemically reactive nonvolatile binder, insoluble particulate material for polishing, and an immiscible phase forming an emulsion with the other components, thereby holding the particulate matter in suspension. Anionic surfactants are added to improve wetting, along with a conventional wetting agent. The mixture of solvents promotes reflow of the disc surface, while the binder fills in deformations and provides a permanent protective coating.

9 Claims, No Drawings

COMPACT DISC REVITALIZER FORMULATIONS AND REVITALIZER

This application is a continuation-in-part of provisional application Ser. No. 60/015,769, filed Apr. 16, 1996.

BACKGROUND OF THE INVENTION

1. Field of the Invention

This invention relates in general to refinishing and resurfacing fluids. In particular, the invention relates to a composition formulated to restore the damaged surface of the transparent side of an optical disc to a condition where data can once more be reliably read from the disc.

2. Description of the Related Art

Various formats of optical discs are in wide use today. The most popular formats are the audio compact disc, the computer CD-ROM disc, and the larger sized video disc. Information is stored digitally as a series of pits and lands, formed in a reflective film, and located in a spiral pattern around the disc. A relatively thick transparent plastic substrate covers and protects the reflective film. A laser beam (or several redundant beams) are focused on the reflective film through the plastic substrate to read the stored data. Minor scratches on the surface of the substrate are in the region of the laser beam that is relatively unfocused and diffused, so that the scratch does not substantially impair the ability of the laser to focus properly. However, if the scratch is sufficiently large, the laser will not focus properly on the area of interest, and data read errors will occur. The data also cannot be read properly if the surface is made hazy by solvents or other chemicals. Error correction schemes and multiple laser beams directed at the disc from different angles are used to help prevent and reduce the effect of data read errors, but many scratches are still bad enough to make certain parts of the disc unreadable. While this can cause an annoying 'skip' or noise on an audio or video disc, the affect on a computer data disc can be devastating, completely preventing use of the data on the disc.

U.S. Pat. No. 5,571,041, issued on Nov. 5, 1996 to Leikam, discloses a method for refinishing compact discs employing a motor-mounted disc for rotating the compact disc while sequentially applying a chemical cleaner, a plastic cleaner, and a plastic polish to the clear plastic side of the disc. The compact disc is then removed from the motor-mounted disc and a thin plastic cover film is applied to the disc to prevent future damage. The method requires the use of specialized equipment and the typical consumer would likely find it too involved and difficult to carry out. Also, it may be difficult to use the equipment on double-sided discs, such as video discs. A composition that can perform the cleaning, resurfacing and covering steps simultaneously would be more desirable. A composition that can be applied by hand without the need for extra equipment is also desirable.

SUMMARY OF THE INVENTION

Accordingly, a general object of the invention is a composition that will reduce surface defects and hazing on an optical disc having a polycarbonate transparent side so that information encoded on a reflective film behind the transparent side can be reliably read through the transparent side. Another object is that the composition achieve resurfacing of the disc at least partially by causing limited dissolution and reflowing of the exposed surface of polycarbonate material. A third object of the invention is that resurfacing can be achieved by a consumer without specialized equipment or procedures.

These objects in general are obtained by a composition having a number of components, primarily including a mixture one or more volatile organic solvents, where the mixture is designed to have formulated solubility with the polycarbonate polymer in the optical disc. This allows the polycarbonate to soften and partially reflow, without causing excessive loss of thickness of the polycarbonate which could affect focusing of the laser beam that reads the disc. The composition also has a nonvolatile binder made of one or both of two ingredients: an aminofunctional dimethylpolysiloxane (with various possible amine functionalities), and a polydimethylsiloxane. An effective amount of insoluble particulate materials having particle sizes ranging from about 0.2 microns to about 15 microns in diameter is suspended in the composition, and performs the job of polishing the surfaces to optical smoothness. An immiscible phase is added to create an emulsion that helps to keep the insoluble particulate matters suspended, and to improve the composition's viscosity. Anionic surfactants such as nonylphenoxypoly (ethyleneoxy) x ethanol and poly (ethyleneoxy) y nonylphenol are added to improve the ability of the composition to wet the surface of the optical disc, in addition to wetting agents such as diethylene glycol and an alkyl quaternary ammonium salt, the latter being employed as a zwitterion. Pigment and fragrance can also be added for aesthetic appeal.

The composition has several advantages, including the ability to clean, polish, resurface, and apply a protective coating to the surface of the optical disc all in one step. The composition does not require specialized equipment or methods of application. Rather, the composition can simply be wiped over the surface of the optical disc using a clean cloth. An important feature of the composition is its ability to soften the surface of the transparent side using a volatile organic solvent mixture having a specially formulated solubility. This allows the polycarbonate surface to relax and smooth out during application of the composition, then immediately reharden when the volatile components evaporate. The protective coating deposited on the disc provides partial protection from solvent vapors, and has anti-static qualities.

The above, as well as additional objects, features, and advantages of the invention will become apparent in the following detailed description.

DESCRIPTION OF THE PREFERRED EMBODIMENT

The composition consists of the following components, which are listed along with the minimum and maximum amounts of each in the formula, on a weight percent basis:

| Name of Component | Min. | Max. |
|---|---|---|
| Component A | 10 | 85 |
| Component B | 0 | 20 |
| Component C | 0 | 30 |
| Component D | 0 | 70 |
| Distilled Water | 0 | 60 |
| Nonylphenoxypoly (ethyleneoxy)x Ethanol | 0 | 10 |
| Poly(ethyleneoxy)y Nonylphenol | 0 | 5 |
| Diethylene Glycol | 0 | 5 |
| Alkyl Quaternary Ammonium Salt | 0.1 | 5 |
| Alkyd Polymeric Resin | 0 | 5 |
| Titanium Oxide | 0 | 2 |
| Phthalo Blue Pigment | 0 | 1 |
| Fragrance | 0 | 4 |

Component (a) of the composition is a mixture of one or more volatile organic solvents. All the ingredients of component (a) have relative evaporation rates at least half that of normal butyl acetate, and are miscible in normal heptane. The ingredients can be naphthenic, branched, cyclic, aromatic, ketones, esters, alcohols, or combinations of one or more of these forms. The amount and type of each compound used in the mixture is chosen so that the mixture will have a set of solubility parameters falling within a designed range. There are three parameters, which will be represented for convenience by the symbols $\delta_n$, $\delta_p$, and $\delta_h$. These parameters are measures of solubility of the mixture with respect to the nonpolar, polar, and hydrogen-bonding aspects of the mixture, respectively, and are expressed in units of g-cal/mole. The polar and hydrogen-bonding parameters $\delta_p$ and $\delta_h$ primarily describe the chemical aspects of solubility of the mixture (or of an individual ingredient), while the nonpolar parameter $\delta_n$ mainly describes the physical solubility aspects of the mixture (or an ingredient). If these three parameters are viewed as the axes of a three-dimensional solubility space, then there is a total solubility parameter, represented by $\delta_t$, located in the space that is the positive root of the equation:

$$\delta_t = \sqrt{\delta_h^2 + \delta_n^2 + \delta_p^2} \quad 1)$$

In other words, the total solubility $\delta_t$ is the distance from the origin to the point representing the total solubility parameter. For mixtures of nonpolar, polar, and hydrogen bonding organic compounds, the total solubility parameter $\delta_t$ can be derived from the Haggenmacher equation for vapor pressure and expressed in the following form:

$$\delta_t = \sqrt{\frac{RTd}{M}} \sqrt{1 - \frac{PT_c^3}{P_c T^3} \left[ \frac{2.303BT}{(t+C)^2} - 1 \right]} \quad 2)$$

Where:

R=gas constant=1.987 cal/mole/°K
$T_b$=Boiling temperature, °K
$T_c$=Critical temperature, °K
M=molecular weight, g/mole
P=Pressure, mm of Hg
T=Absolute Temperature, °K
t=Temperature, °C
d=Density, g/ml
$P_c$=Critical pressure, mm of Hg
A,B,C=constants in Antoine's equation:

$$\log P = \frac{-B}{t+C} + A$$

The Antoine equation can be used to find both the boiling temperature at 760 mm of Hg and the vapor pressure at 25° C.

We can define an aggregation constant, represented by $\alpha$, by the relationship:

$$\log \alpha = 3.39066 \frac{T_b}{T_c} - 0.15848 - \log \frac{M}{d} \quad 3)$$

The hydrogen bonding parameter $\delta_h$ and the polar parameter $\delta_p$ can then be expressed in terms of the aggregation constant $\alpha$ and the total solubility parameter $\delta_t$ by the equations:

$$\delta_h = \delta_t \sqrt{\frac{\alpha - 1}{\alpha}} \quad 4)$$

and $$\delta_p = \delta_t \sqrt{\frac{\Sigma F_p}{\alpha \Sigma F_t}} \quad 5)$$

where $F_p$ and $F_t$ are the molar cohesion constants for the individual compounds at constant pressure and constant temperature, respectively. These constants are based on the chemical structural identity of the solvents. Tables of these constants for various chemical functional groups, found by experiment, are available from sources such as the CRC "Handbook of Chemistry and Physics," 63rd Edition. The nonpolar parameter $\delta_n$ can then be derived from Eq. (1):

$$\delta_n = \sqrt{\delta_t^2 - (\delta_p^2 + \delta_h^2)} \quad 7)$$

The following table lists several examples of possible mixtures for component (a) providing total solubility parameters in the specified range. In each column, the individual compounds used in that example are listed by weight percent.

TABLE 1

| Component Name | Ex. 1 | Ex. 2 | Ex. 3 | Ex. 4 | Ex. 5 |
|---|---|---|---|---|---|
| Acetone | 25.6 | — | — | 5.0 | — |
| Cyclohexane | 31.3 | 63.0 | — | 57.0 | 40.0 |
| Decane | 16.5 | 6.8 | — | 8.0 | 30.0 |
| 2-Methyldecane | 4.7 | — | 89.8 | — | 25.0 |
| Heptane | 13.1 | — | — | — | — |
| Isopropanol | 7.6 | 30.2 | 9.7 | 12.0 | 5.0 |
| Ethanol | 1.2 | — | 0.5 | 18.0 | — |
| Total | 100.0 | 100.0 | 100.0 | 100.0 | 100.0 |

TABLE 2

| Solubility Parameter | Ex. 1 | Ex. 2 | Ex. 3 | Ex. 4 | Ex. 5 |
|---|---|---|---|---|---|
| $\delta_n$ | 7.36 | 7.67 | 7.61 | 7.46 | 7.80 |
| $\delta_p$ | 2.13 | 2.39 | 0.49 | 2.65 | 0.84 |
| $\delta_h$ | 2.09 | 2.36 | 0.81 | 2.97 | 0.39 |

In Table 2, the solubility parameters of the resulting mixtures are listed for each of the five examples in Table 1, in g-cal/mole.

In the preceding discussion, it is assumed that the law of mixtures applies for $\delta_n$, $\delta_p$, and $\delta_h$ values of mixed ingredients, i.e. for the mixture, each solubility parameter is equal to the sum of the products of the values of that parameter for the ith individual component times that component's mole fraction. Expressed in mathematical terms:

$$\delta_n = \sum_{1}^{m} \delta_{n,i} x_i \quad 7)$$

$$\delta_p = \sum_{1}^{m} \delta_{p,i} x_i \quad 8)$$

$$\delta_h = \sum_{1}^{m} \delta_{h,i} x_i \quad 9)$$

where $x_i$ is the mole fraction of the ith component and m is the number of components in the mixture.

Component (a) provides pseudo-solubility for the polycarbonate polymer substrate of the optical disc. This means that polycarbonate will not completely dissolve in component (a), but is softened sufficiently to allow the surface to reflow to a limited extent, i.e. the polycarbonate at the surface relaxes sufficiently to melt, then resolidify as the volatile components evaporate, so that many minor surface defects are filled in (or flattened) by the reflow. Further resurfacing is accomplished by polishing the surface with abrasive particulate material held in suspension by an emulsion, and by filling minor depressions with a nonvolatile binder, as will be discussed below. It appears possible to develop a composition where the reflow effect is the major mechanism for resurfacing, thereby eliminating the need for the abrasive particulate material and the emulsion.

Component (b) of the composition is a nonvolatile chemically reactive binder made up of one or both of two ingredients: an aminofunctional dimethylpolysiloxane, and a polydimethylsiloxane. The aminofunctional dimethylpolysiloxane can have primary, secondary, or tertiary amine functionality, i.e. the amine functional group can take any of the following three basic forms:

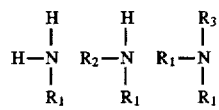

where $R_1$ represents a dimethylpolysiloxane group. $R_2$ and $R_3$ normally represent organic functional groups, including another dimethylpolysiloxane group, although nonorganics such as oxygen and sulfur can also be used. The amine functional groups covalently bond to the polycarbonate polymer, acting as a filler. The aminofunctional dimethylpolysiloxane acts both as a residual filler that ionically bonds to the disc surface, and as part of the protective coating. The aminofunctional dimethylpolysiloxane fluid's amine functionality can range from 0 to about 3 milliequivalents per gram, and the viscosity ranges from about 35 to about 10,000 centistokes.

The polydimethylsiloxane fluid does not bind chemically to the optical disc surface, but provides a coupler to bind the aminofunctional dimethylpolysiloxane both to the polycarbonate surface and to the rest of the composition by improving compatibility between the polycarbonate polymer and the resurfacing components in the composition. Without the polydimethylsiloxane, surface tension between the polycarbonate and the rest of the composition would be too great and would impair the transfer of aminofunctional dimethylpolysiloxane to the polycarbonate surface. The polydimethylsiloxane fluid has viscosity ranging from about 100 to about 10,000 centistokes.

Components (c) and (d) are both comprised of abrasive particulate matter that is insoluble in any of the liquid phases of the composition. They are both made of the same materials, the only difference being in their size: component (c) consists of particles having diameters between 0.2 microns and 10 microns, component (d) consists of particles having diameters between 0.5 microns and 15 microns. The ratio of the average diameters of components (c) and (d) should be between 1:4.1 and 1:7.1 inclusive, while the ratio of the amounts of components (c) and (d) by weight should be between 2:1 and 3.33:1 inclusive. When these criteria are met, a spacial compatibility is created, wherein the smaller particles will tend to fill voids that would otherwise form between the larger particles. This helps improve the particulate bulk density and the stability of the dispersion of particles in the composition. Any known suitable materials may be used such as aluminum silicate, aluminum oxide, calcium carbonate, calcium silicate, magnesium oxide, magnesium silicate, and magnesium aluminum silicate.

The distilled water is used to create an immiscible phase with the organic components phase. Under normal circumstances, the two phases will form an emulsion that keeps the insoluble particulate materials of components (c) and (d) in suspension, and raises the effective viscosity, which improves the composition's flow characteristics during application and helps stabilize the particles against settling during packaging and application.

Other ingredients may be added to improve the composition's performance and aesthetics. Such ingredients could include the use of diethylene glycol and an alkyl quaternary ammonium salt as wetting agents. The alkyl quaternary ammonium salt acts as a zwitterion, i.e. a dipolar ion, carrying both a positive and a negative charge. The zwitterion ionically bonds the positively charged components in the composition to the negatively charged polycarbonate disc, and acts as an anti-static agent to prevent dust from collecting on the disc surface. Pigments such as titanium oxide and phthalo blue can also be used. A binding agent such as a commercial alkyd polymeric resin is then used to coat the pigment particles and disperse the pigmentation on the optical disc. An effective amount of fragrance can also be added.

The following examples help to illustrate the invention, the possible modification of its important elements and its performance.

EXAMPLES 1a TO 1e

Component (a) was formulated using the compounds and amounts listed in the five example columns of Table 1. For each of the five mixtures, the composition was then formulated as follows:

| Compound Name | Weight % |
|---|---|
| Component (a) | 62.68 |
| Component (b) | 7.50 |
| Component (c) | 18.19 |
| Component (d) | 8.33 |
| Distilled Water | 0.00 |
| Nonylphenoxypoly(ethyleneoxy)x Ethanol | 1.00 |
| Poly(ethyleneoxy)y Nonylphenol | 0.03 |
| Diethylene Glycol | 0.05 |
| Alkyl Quaternary Ammonium Salt | 1.00 |
| Alkyd Polymeric Resin | 0.50 |
| Titanium Oxide | 0.20 |
| Phthalo Blue Pigment | 0.02 |
| Fragrance | 0.50 |
| Total | 100.00 |

EXAMPLE 2

A composition was formulated with component A being made up of 89.75% 2-methyldecane, 9.68% isopropanol, and the balance of ethanol, on a weight basis. The composition was then formulated as follows:

| Compound Name | Weight % |
|---|---|
| Component (a) | 38.33 |
| Component (b) | 5.00 |
| Component (c) | 14.00 |
| Component (d) | 6.92 |
| Distilled Water | 33.32 |
| Nonylphenoxypoly(ethyleneoxy)x Ethanol | 1.00 |
| Poly(ethyleneoxy)y Nonylphenol | 0.01 |
| Diethylene Glycol | 0.01 |
| Alkyl Quaternary Ammonium Salt | 0.78 |
| Alkyd Polymeric Resin | 0.01 |
| Titanium Oxide | 0.10 |

-continued

| Compound Name | Weight % |
| --- | --- |
| Phthalo Blue Pigment | 0.02 |
| Fragrance | 0.50 |
| Total | 100.00 |

The preceding example solutions were applied to the transparent side surfaces of hundreds of defective 5¼ inch (133 millimeter) nominal diameter audio and ROM data discs, obtained from a number of different stores. In 95% of the cases, applying the composition essentially restored the defective discs to original performance levels. The remaining 5% mainly failed due to damage in the reflective film rather than because of defects in the surface of the transparent side of the disc.

The invention has been shown by example in several embodiments. It should be apparent to those skilled in the art that the invention is not limited to these embodiments, but is susceptible to various changes and modifications without departing from the scope of the claims and the spirit of the invention.

We claim:

1. A composition for use on an optical disc having a transparent side comprised predominantly of polycarbonate polymer plastic, the composition comprising:

a) a volatile organic solvent having pseudo-solubility with the polycarbonate polymer, the solvent having solubility parameters located within the following domain volume:

| $\delta_p$ | $\delta_h$ | $\delta_n$ |
| --- | --- | --- |
| (Polar) | (H-bonding) | (Nonpolar) |
| 0.65 | 0.00 | 5.00 |
| 0.00 | 0.65 | 5.00 |
| 2.90 | 1.75 | 5.00 |
| 2.25 | 5.00 | 5.00 |
| 0.65 | 0.00 | 9.00 |
| 0.00 | 0.65 | 9.00 |
| 2.90 | 1.75 | 9.00 |
| 2.25 | 5.00 | 9.00 | b) a nonvolatile binder comprising at least one component selected from the group consisting of:

i) an aminofunctional dimethylpolysiloxane with various amine functionalities, with total amine functionality of from 0 to about 3 milliequivalents/gram; and ii) a polydimethylsiloxane;

c) an effective amount of a mixture of insoluble particulate materials having particle sizes ranging from about 0.2 microns to about 15 microns in diameter;

d) an effective amount of an agent, immiscible in components (a) and (b), for forming an emulsion for suspending the insoluble particulate materials of component (c).

2. A composition as recited in claim 1, further comprising an effective amount of an nonionic surfactant.

3. A composition as recited in claim 2, wherein the nonionic surfactant comprises at least one component selected from the group consisting of nonylphenoxypoly (ethyleneoxy), ethanol and poly (ethyleneoxy)$_y$ nonylphenol, wherein x is a positive whole number between 1 and 50, and y is a positive whole number between 1 and 50.

4. A composition as recited in claim 1, wherein the insoluble particulate materials of component (c) are selected from the group consisting of aluminum silicate, aluminum oxide, calcium carbonate, calcium silicate, magnesium oxide, magnesium silicate, and magnesium aluminum silicate.

5. A composition as recited in claim 1, further comprising an effective amount of a wetting agent.

6. A composition as recited in claim 5, wherein the wetting agent is diethylene glycol.

7. A composition as recited in claim 1, further comprising a zwitterion acting as a wetting agent between the polycarbonate polymer and the nonvolatile binder.

8. A composition as recited in claim 7, wherein the zwitterion is an alkyl quaternary ammonium salt.

9. A composition as recited in claim 1, wherein component (a) is a mixture of at least two components selected from the group consisting of acetone, cyclohexane, decane, 2-methyldecane, heptane, isopropanol, and ethanol.

* * * * *